United States Patent
Rei et al.

(10) Patent No.: US 11,273,828 B2
(45) Date of Patent: Mar. 15, 2022

(54) AUTOMOTIVE PREVENTIVE ELECTRONIC STABILITY CONTROL

(71) Applicant: C.R.F. SOCIETA' CONSORTILE PER AZIONI, Orbassano (IT)

(72) Inventors: Claudio Rei, Orbassano (IT); Enrico Raffone, Orbassano (IT); Massimo Fossanetti, Orbassano (IT)

(73) Assignee: C.R.F. SOCIETA' CONSORTILE PER AZIONI, Orbassano (IT)

( * ) Notice: Subject to any disclaimer, the term of this patent is extended or adjusted under 35 U.S.C. 154(b) by 161 days.

(21) Appl. No.: 16/688,414

(22) Filed: Nov. 19, 2019

(65) Prior Publication Data
US 2020/0156638 A1 May 21, 2020

(30) Foreign Application Priority Data
Nov. 20, 2018 (IT) .................... IT102018000010456

(51) Int. Cl.
*B60W 30/14* (2006.01)
*B60W 40/072* (2012.01)

(52) U.S. Cl.
CPC ........ *B60W 30/146* (2013.01); *B60W 40/072* (2013.01); *B60W 2556/50* (2020.02); *B60W 2720/106* (2013.01); *B60W 2720/125* (2013.01)

(58) Field of Classification Search
CPC ............. B60W 30/146; B60W 40/072; B60W 2556/50; B60W 2720/106; B60W 2720/125
USPC .......................................................... 701/93
See application file for complete search history.

(56) References Cited

U.S. PATENT DOCUMENTS

| 9,399,450 | B2* | 7/2016 | Raste | B60W 30/18136 |
| 2011/0301802 | A1* | 12/2011 | Rupp | G08G 1/096741 |
| | | | | 701/408 |
| 2013/0173149 | A1* | 7/2013 | Lu | G01C 21/32 |
| | | | | 701/410 |

(Continued)

FOREIGN PATENT DOCUMENTS

JP 2015138330 A 7/2015

OTHER PUBLICATIONS

Italian Search Report dated Aug. 13, 2019 in corresponding Italian Patent Application No. 102018000010456 (8 pages).

*Primary Examiner* — Thomas G Black
*Assistant Examiner* — Matthias S Weisfeld
(74) *Attorney, Agent, or Firm* — Harness, Dickey & Pierce, P.L.C.

(57) ABSTRACT

An automotive electronic preventive active safety system comprising a control module configured to receive data indicative of a current position of a vehicle, of roads and characteristics thereof including road curvature, and of potential driving routes of the motor-vehicle from a current position up to an electronic horizon thereof. If a current speed of the vehicle at the current position is greater than or equal to a driving speed determined by a driving speed profile for the current position, the control module is configured to at least one of: command the motor-vehicle to decelerate to the driving speed determined by the driving speed profile for the current position; and generate a request to a driver of the motor-vehicle to decelerate the motor-vehicle to the driving speed determined by the driving speed profile for the current position.

10 Claims, 5 Drawing Sheets

(56) References Cited

U.S. PATENT DOCUMENTS

| | | | |
|---|---|---|---|
| 2013/0274956 A1* | 10/2013 | Pilutti | G08G 1/096725 |
| | | | 701/1 |
| 2015/0151756 A1 | 6/2015 | Han | |
| 2017/0074663 A1* | 3/2017 | Giurgiu | G05D 1/0212 |
| 2018/0201262 A1 | 7/2018 | Yoon et al. | |

* cited by examiner

Inventions include:

AUTOMOTIVE PREVENTIVE ELECTRONIC STABILITY CONTROL

CROSS REFERENCE TO RELATED PATENT APPLICATION

This patent application claims the benefit and priority of Italian Patent Application No. 102018000010456 filed on Nov. 20, 2018, the entire disclosure of which is incorporated herein by reference.

Technical Field of Invention

The present invention relates in general to an automotive electronic active safety system, and in particular to an automotive preventive electronic stability control system.

The present invention finds application in any type of road motor-vehicle, whether intended for transporting people, such as a car, bus, camper, etc., or goods, such as an industrial motor-vehicle (lorry, articulated lorry, articulated vehicle, etc.) or a light or medium-heavy commercial vehicle (van, box van, chassis cab, etc.).

BACKGROUND

Some examples of automotive electronic control systems are disclosed in U.S. Pat. Nos. 9,399,450 B2, 8,880,294 B2, EP 2 734 425 B1, EP 2 165 896 A1, EP 1 805 530 B1, DE 10 2009 041 580 A1, JP 2015 138330 A, US 2015/151756 A1 and US 2018/201262 A1.

In particular, U.S. Pat. No. 9,399,450 B2 discloses a method and a system for promoting a uniform driving style of a motor-vehicle, wherein firstly a longitudinal speed of the motor-vehicle and a curvature radius of a route section ahead of the motor-vehicle are determined when the motor-vehicle approaches the route section, and then an expected lateral acceleration is determined from the curvature radius and longitudinal speed as the route section is driven through. The expected lateral acceleration is compared with permanently defined lateral acceleration limiting which can be predefined by the driver and, in the event the expected lateral acceleration is greater than at least one of the lateral acceleration limiting values, the longitudinal speed of the motor-vehicle is lowered by an optical, acoustic, and/or haptic request to the driver and/or by autonomous braking intervention. If the expected lateral acceleration is smaller than or equal to the lower of the lateral acceleration limiting values, the lowering of the longitudinal speed of the motor-vehicle is reduced by decreasing the engine drag torque.

Instead, JP 2015/138330 A discloses a motor-vehicle speed control device comprising an electronic control unit which executes a target trajectory generation function to compute the curvature of a target trajectory predicted from acquired road shape information and obstacle information, and the curvature change rate with respect to the movement distance to each point on the target trajectory to generate the target trajectory having the computed curvature and the curvature change rate. The electronic control unit also implements a steering angle speed upper limit value setting function to set the upper limit value of the steering angle speed allowed in the computed curvature and curvature change rate of the target trajectory. The electronic control unit also implements a control speed computation function to compute a control speed of the motor-vehicle in which the steering angle speed computed from the speed of the motor-vehicle and the curvature change rate becomes equal to or less than the steering angle speed upper limit value. Lastly, the electronic control unit implements a speed control function to cause the motor-vehicle to travel at a speed equal to or lower than the control speed.

SUMMARY

The Applicant has observed that the automotive electronic stability control system disclosed in U.S. Pat. No. 9,399,450 B2 operates based on topographic data, in the form of a curvature radius, of a road bend along a road section of a calibratable length, for example a few tens of metres, ahead of the motor-vehicle, and that this feature can, along with others and in certain driving scenarios, be one of the concauses resulting in a behaviour of the automotive electronic stability control system that can give rise to uncomfortable and unsafe driving experiences for the passengers of the motor-vehicle.

Thus, the present invention has the object of providing an automotive preventive stability control algorithm that overcomes the above-indicated drawbacks.

According to the present invention, an automotive electronic preventive active safety system aimed at improving driving stability of a motor-vehicle is provided, as claimed in the appended claims.

DRAWINGS

DETAILED DESCRIPTION

Figure 1:
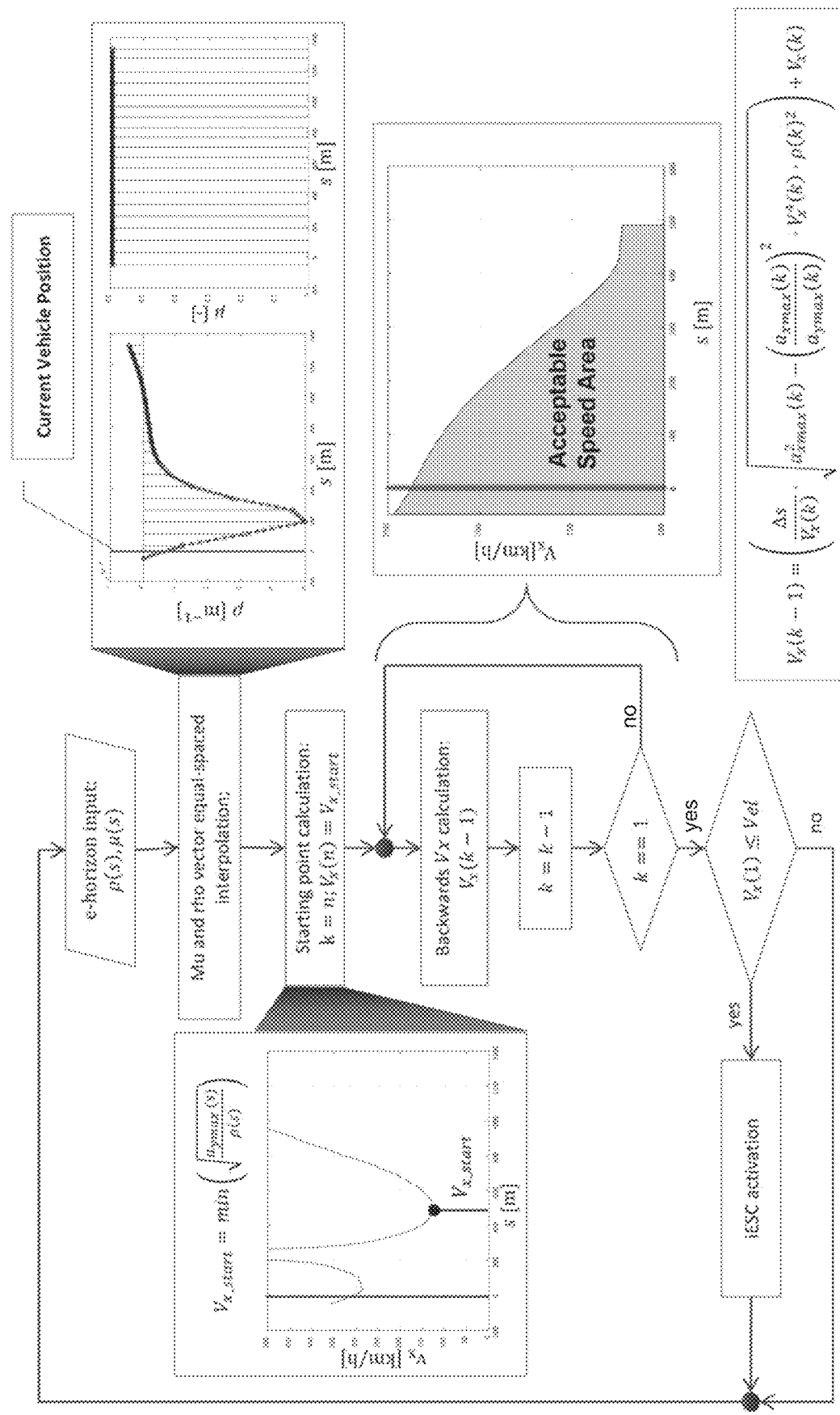
FIG. 1 shows a flowchart of the automotive preventive stability control algorithm according to the present invention, along with graphs showing the development of some physical quantities involved.

The present invention will now be described in detail with reference to the accompanying drawings to enable those skilled in the art to embody it and use it. Various modifications to the described embodiments will be immediately obvious to those skilled in the art, and the generic principles described herein can be applied to other embodiments and applications without departing from the scope of the present invention, as defined in the appended claims. Thus, the present invention is not intended to be limited to the embodiments described and illustrated herein, but is to be accorded the widest scope consistent with the features described and claimed herein.

In short, the present invention comprises identifying a road stretch with driving-safety-critical characteristics, namely characteristics that satisfy a driving-safety critical criterion, along the route of the motor-vehicle from its current position up to an electronic horizon of the motor-vehicle, the significance of which will be described in greater detail hereinafter, and then backwards computing, from the identified driving-safety-critical road stretch up to the current position of the motor-vehicle, a driving speed profile that the motor-vehicle should follow on the road stretch from the driving-safety-critical road stretch so that the latter is driven along at a driving speed that satisfies a given driving safety criterion.

Typical driving-safety-critical road stretches are, for example, road bends, which, if driven along at high speed, possibly in the presence of limited road adherence conditions, certainly represent a critical factor in for driving safety. Therefore, identification of the aforementioned driving-safety-critical road stretch along the most probable driving route of the motor-vehicle results in searching for a road bend with given driving safety-critical characteristics, namely that satisfies a given driving safety-critical criterion, in particular the most driving safety-critical road bend, i.e., the road bend with the smallest curvature radius, to which the following description will make reference, purely by way of example, for ease of description.

Other driving-safety-critical road stretches could even be straight road stretches, which, if driven along in limited road adherence conditions due, for example, to heavy atmospheric precipitations and/or to particularly worn, uneven, or damaged road surfaces, could give rise to aquaplaning or loss of grip, which certainly represents another critical factor for driving safety. In this case, identification of the most driving-safety-critical road stretch along the most probable driving route of the motor-vehicle results in searching for the straight road stretch with the highest driving-safety criticality.

More specifically, by using an analytical approach based on the assumptions that there are no obstacles along the driving route of the motor-vehicle from its current position up to its electronic horizon and that the road properties along the driving route in terms of road curvature and, if available, road adherence are known, the driving speed profile can be computed by using the friction ellipse approach, wherein, as is known, the friction ellipse is a tyre-force ellipse that can be depicted in a so-called GG diagram (see FIG. 4 for example), and is a graphical representation of the grip limit of the motor-vehicle defined by all the combinations of maximum longitudinal and lateral accelerations $a_{xmax}$ and $a_{ymax}$ beyond which the motor-vehicle loses grip.

In mathematical terms, a motor-vehicle grip limit can be expressed via the following equation:

$$\frac{a_x^2}{a_{xmax}^2} + \frac{a_y^2}{a_{ymax}^2} \leq 1 \quad (1)$$

In equation (1), $a_{xmax}$ and $a_{ymax}$ depend upon motor-vehicle and road characteristics, and can therefore change over time based on quantities such as, in primis, adherence $\mu$ and longitudinal and lateral road slopes $\alpha$ and $\beta$, and possibly, in secundis, also the load transfer of the motor-vehicle while being driven.

Maximum longitudinal and lateral accelerations should thus be more correctly expressed as $a_{xmax}(\mu, \alpha, \beta)$, $a_{ymax}(\mu, \alpha, \beta)$, but for reasons of legibility only the dependency of these quantities on time t or road curvilinear coordinate s is considered, depending upon the domain in which equation (1) is expressed.

Starting from this assumption, and considering that, in static conditions:

$$a_y = V_x^2 \cdot \rho \quad (2)$$

by inserting equation (2) in equation (1) and only considering the case of controlling deceleration of the motor-vehicle, the following equation that describes the longitudinal deceleration of the motor-vehicle is obtained:

$$\frac{a_x^2(t)}{a_{xmax}^2(t)} + \frac{(V_x^2 \cdot \rho)^2}{a_{ymax}^2(t)} = 1 \rightarrow a_x = -\sqrt{\left(1 - \frac{(V_x^2 \cdot \rho)^2}{a_{ymax}^2(t)}\right) \cdot a_{xmax}^2(t)} \quad (3)$$

In equation (3), the indicated quantities are expressed as a function of time t, while using the road curvilinear coordinate s, gives:

$$a_x = \frac{dV_x}{dt} = \frac{dV_x}{ds} \cdot \frac{ds}{dt} = \frac{dV_x}{ds} \cdot V_x \quad (4)$$

$$\frac{dV_x}{ds} = -\frac{1}{V_x} \cdot \sqrt{a_{xmax}^2(s) - \left(\frac{a_{xmax}(s)}{a_{ymax}(s)}\right)^2 \cdot V_x^4 \cdot \rho(s)^2} \quad (5)$$

and using a different approximation of the quotient:

$$\frac{dV_x}{ds}(s) = \frac{V_x(s) - V_x(s - \Delta s)}{\Delta s} \quad (6)$$

and inserting equation (5) in equation (6) gives:

$$V_x(s - \Delta s) = \left(\frac{\Delta s}{V_x(s)} \cdot \sqrt{a_{xmax}^2(s) - \left(\frac{a_{xmax}(s)}{a_{ymax}(s)}\right)^2 \cdot V_x^4(s) \cdot \rho(s)^2}\right) + V_x(s) \quad (7)$$

To integrate the differential equation (7) it is necessary to set an initial condition, which can be obtained, purely by way of example and therefore not limitative, by solving equation (3) setting $a_x$=0, a condition that occurs when the road is most critical in terms of lateral acceleration and, consequently, of driving speed, i.e., when driving through the most driving-safety-critical road bend along the driving route of the motor-vehicle from its current position to its electronic horizon:

$$\sqrt{\left(1 - \frac{(V_x^2(s) \cdot \rho(s))^2}{a_{ymax}^2(s)}\right) \cdot a_{xmax}^2(s)} = 0 \rightarrow V_{x\_start} = \min\left(\sqrt{\frac{a_{ymax}(s)}{\rho(s)}}\right) \quad (8)$$

To identify the most driving-safety-critical road bend it is therefore necessary to solve equation (8) for all the road bends and adherences and find the absolute minimum. The most stability-safety-critical and, hence, driving-safety-critical road stretches for the motor-vehicle are in fact those for which $V_x$ computed via equation (8) is a minimum ($V_{x\_start}$).

When using the friction ellipse approach, it is necessary to limit the current lateral acceleration reference in order to avoid exceeding the limits.

In this case, the real-time implementation of equation (3) is:

$$|a_{xsat}| = \sqrt{\left(1 - \frac{a_y^2}{a_{ymax}^2}\right) \cdot a_{xmax}^2} \quad (9)$$

As stated above, the above-described initial condition is, by way of example, relative to the driving through the most driving-safety-critical road bend, where an excessive lateral acceleration might result in the loss of grip.

It is understood that identification of other types of driving-safety-critical road stretches requires the definition of other more appropriate initial conditions.

Regarding the aforesaid electronic horizon of the motor-vehicle, as is known, modern motor-vehicles are equipped with advanced driver assistance systems (ADAS) to increase driving comfort, economy, and safety. These advanced driver assistance systems usually receive input from sensors that monitor the environment around the motor-vehicles and which are limited in terms of detection distance and angles of view. The environment behind other objects, more than a few metres away, is not usually visible.

Therefore, the use electronic maps of the automotive global satellite navigation system as an additional sensor has been proposed to see beyond the road bends and the "map as a sensor" is commonly referred to as electronic horizon, which represents the road network and its characteristics ahead of motor-vehicles up to a certain calibratable distance ahead of the motor-vehicles that can vary, depending upon the case of usage, from a few hundred metres to several kilometres.

The electronic horizon of a motor-vehicle is therefore indicative of possible driving routes of the motor-vehicle from its current position and for a certain distance ahead of the motor-vehicle. For each possible driving route within the electronic horizon, this may include one or more road junctions through which the driver may drive the motor-vehicle. It is possible to assign a driving probability to each driving route identified within the electronic horizon and these probabilities can be based on the most likely manoeuvres that the driver might perform at each road junction identified within the electronic horizon. Determining the most likely and the least likely driving routes that the motor-vehicle might travel along at each road junction within the electronic horizon can be based on a predetermined classification of all the possible driving routes that the can be taken at that road junction, taking into account static information regarding the road network, such as curvature radii of the road bends, road classifications, road signs, and speed limits, or dynamic information, such as direction indicators, driving history, driving speed, etc.

Basically, the electronic horizon of a motor-vehicle is nothing more than a collection of data that identifies the roads and the road junctions that the motor-vehicle can travel along from its current position and up to a certain distance ahead of the motor-vehicle, as well as potential driving routes that could be taken by the motor-vehicle from its current position.

Each motor-vehicle equipped with an automotive global satellite navigation system can generate its own electronic horizon and provide it to other motor-vehicles or electronic devices designed to receive and process the received electronic horizons. Electronic horizons can also be stored in a data storage device such as a respective dataset of the motor-vehicle.

Further details regarding electronic horizons of motor-vehicles are for example, disclosed in U.S. Pat. Nos. 6,450,128 B1, 6,735,515 B1, 8,717,192 B2, 9,330,564 B2 and 9,799,216 B2, to which reference may be made.

FIG. 1 shows a flowchart of the automotive preventive stability control algorithm according to the present invention, which flowchart is supplemented with graphs that show developments of physical quantities involved, in particular road adherence and curvature within the electronic horizon of the motor-vehicle.

The automotive preventive stability control algorithm according to the present invention comprises backwards computing a driving speed profile that the motor-vehicle should follow from its current position up to a road stretch with given driving-safety-critical characteristics along its driving route and that, as previously stated, purely by way of example, will be considered the most driving-safety-critical road bend along the driving route of the motor-vehicle from its current position and up to its electronic horizon.

The driving route of the motor-vehicle could be the most probable driving route amongst the possible driving routes of the motor-vehicle from its current position, if the motor-vehicle's global satellite navigation system is configured to output data indicative of these possible driving routes and of the associated driving probabilities, or could be the only driving route provided by the motor-vehicle's global satellite navigation system, if the latter is so configured.

In particular, the automotive preventive stability control algorithm according to the present invention essentially comprises implementing the following operations:

receiving from the motor-vehicle's satellite navigation system data indicative of the current position of the motor-vehicle, of the roads, road junctions, and their attributes, such as road curvature $\rho(s)$ and, if available, road adherence $\mu(s)$, and of the potential driving routes of the motor-vehicle from its current position up to its electronic horizon, possibly enriched/supplemented with further information provided by the motor-vehicle's sensory system, extracting, from the electronic horizon of the motor-vehicle, the road curvature $\rho(s)$ and, if available, the road adherence $\mu(s)$ along the driving route of the motor-vehicle from its current position up to its electronic horizon, if the road curvature $\rho(s)$ and the road adherence $\mu(s)$ are provided as a sequence of discrete values unevenly mutually spaced along the most probable driving route of the motor-vehicle, interpolating these values to determine discrete values of road curvature $\rho(s)$ and road adherence $\mu(s)$ that are evenly mutually spaced along the driving route of the motor-vehicle, then identifying the most driving-safety-critical road bend along the driving route of the motor-vehicle from which backwards computing the driving speed profile of the motor-vehicle to its current position;

then backwards computing, from the identified most driving-safety-critical road bend and up to the current position of the motor-vehicle, the driving speed profile that the motor-vehicle should follow along its driving route from its current position up to the identified most driving-safety-critical road bend, so as to result in the latter being driven through at a driving speed that satisfies a driving safety criterion, then, upon completion of the backwards computation, comparing the current and backwards computed speeds of the motor-vehicle in its current position, wherein the backwards computed speed represents the speed that motor-vehicle should have in its current position in order to reach the speed $V_{x\_start}$ in the identified most driving-safety-critical road stretch, if the current speed of the motor-vehicle in its current position is greater than or equal to the backwards computed speed of the motor-vehicle in its current position, causing the motor-vehicle to decelerate to such an extent as to result in the most driving-safety-critical road bend being driven through at a driving speed that satisfies the driving safety criterion, and if the current speed of the motor-vehicle in its current position is lower than the backwards computed speed of the motor-vehicle in its current position, then no intervention on the motor-vehicle is necessary to cause the most driving-safety-critical road bend being driven through at a driving speed that satisfies the driving safety criterion, and the above operations are repeated.

With regard to the most driving-safety-critical road bend, it is identified based on the road curvature ρ(s) and, if available, the road adherence μ(s) along the most probable driving route of the motor-vehicle.

In particular, as stated above, the most driving-safety-critical road bend is identified by searching for the minimum driving speed of a road stretch along the most probable driving route of the motor-vehicle based on the road curvature ρ(s) and, if available, the road adherence μ(s) along the driving route of the motor-vehicle and on a lateral acceleration limit value $a_{ymax}(s)$ that the motor-vehicle is set not to exceed while driving along the most driving-safety-critical road stretch.

In the example considered, the most driving-safety-critical road bend is identified, as said above, as the position s along the driving route of the motor-vehicle with the minimum driving speed based on the above-indicated driving safety criterion, that is:

$$V_{x\_start} = \min\left(\sqrt{\frac{a_{ymax}(s)}{\rho(s)}}\right)$$

With regard to the driving speed profile, it is backwards computed based on the road curvature ρ(s) and, if available, the road adherence μ(s) along the driving route of the motor-vehicle, as well as on the maximum longitudinal deceleration $a_{ymax}$ (s) that the motor-vehicle is set not to exceed during braking, and which, among other things, depends on proprietary considerations of the automotive manufacturer in terms of driving comfort and on the braking capability of the motor-vehicle's braking system.

With regard to the longitudinal deceleration $a_y(s)$ that is to be applied to the motor-vehicle to result in the most driving-safety-critical stretch of road being driven through at a driving speed that satisfies the driving safety criterion, it can be alternatively achieved either by appropriately controlling the motor-vehicle's braking system or by making a visual/audible/haptic request to the driver of the motor-vehicle via the automotive user interface.

FIG. 1 shows the developments, as a function of the road curvilinear coordinate s, of the driving speed $V_x$ of the motor-vehicle, with the indication of the most driving-safety-critical road bend where the driving speed $V_x$ computed via equation (8) is a minimum ($V_{x\_start}$), of the road curvature ρ(s) and of the road adherence μ(s) after possible interpolation of the received discrete values, and of the driving speed profile $V_x$ of the motor-vehicle backwards computed from the most driving-safety-critical road bend.

In addition, in FIG. 1, the area subtended by the backwards-computed driving speed profile $V_x$ of the motor-vehicle is labelled as "Acceptable Speed Area", this term indicating that any driving speed $V_x$ that the motor-vehicle assumes within this area enables the objective of causing the motor-vehicle to drive along the most driving-safety-critical road bend at a driving speed that does not exceed the computed driving speed $V_{x\_start}$ to be achieved.

Figure 2:
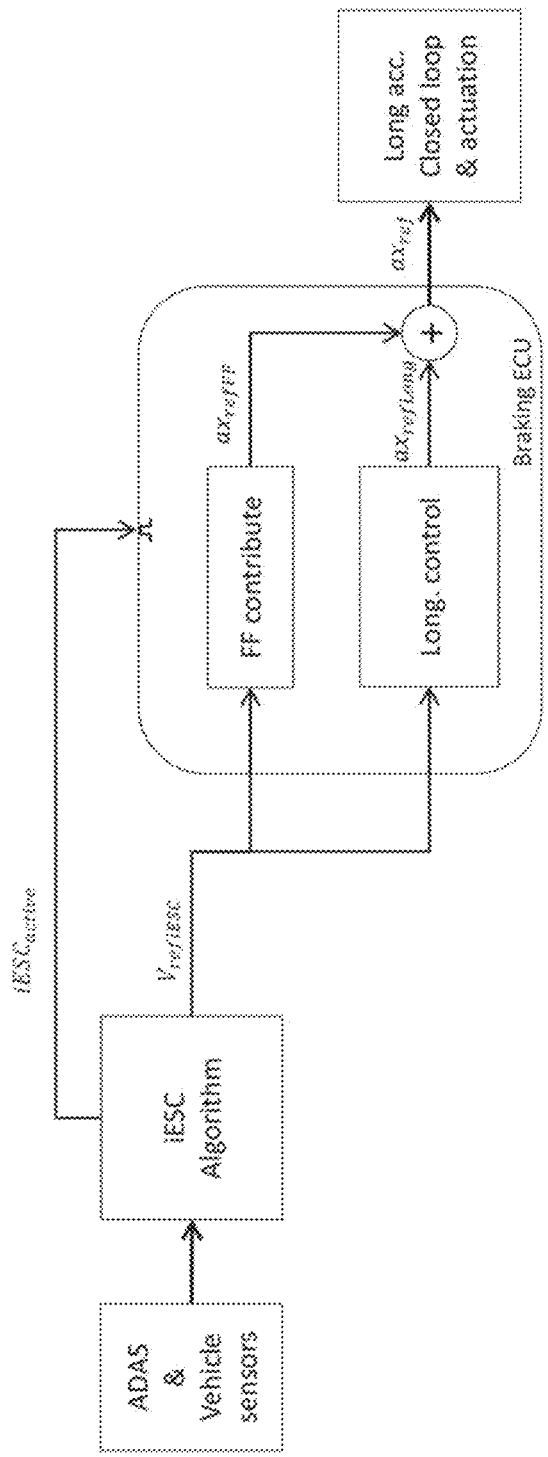
FIG. 2 shows a block diagram of a Simulink architecture used to simulate the behaviour of the automotive preventive stability control algorithm according to the present invention.
Figure 3:
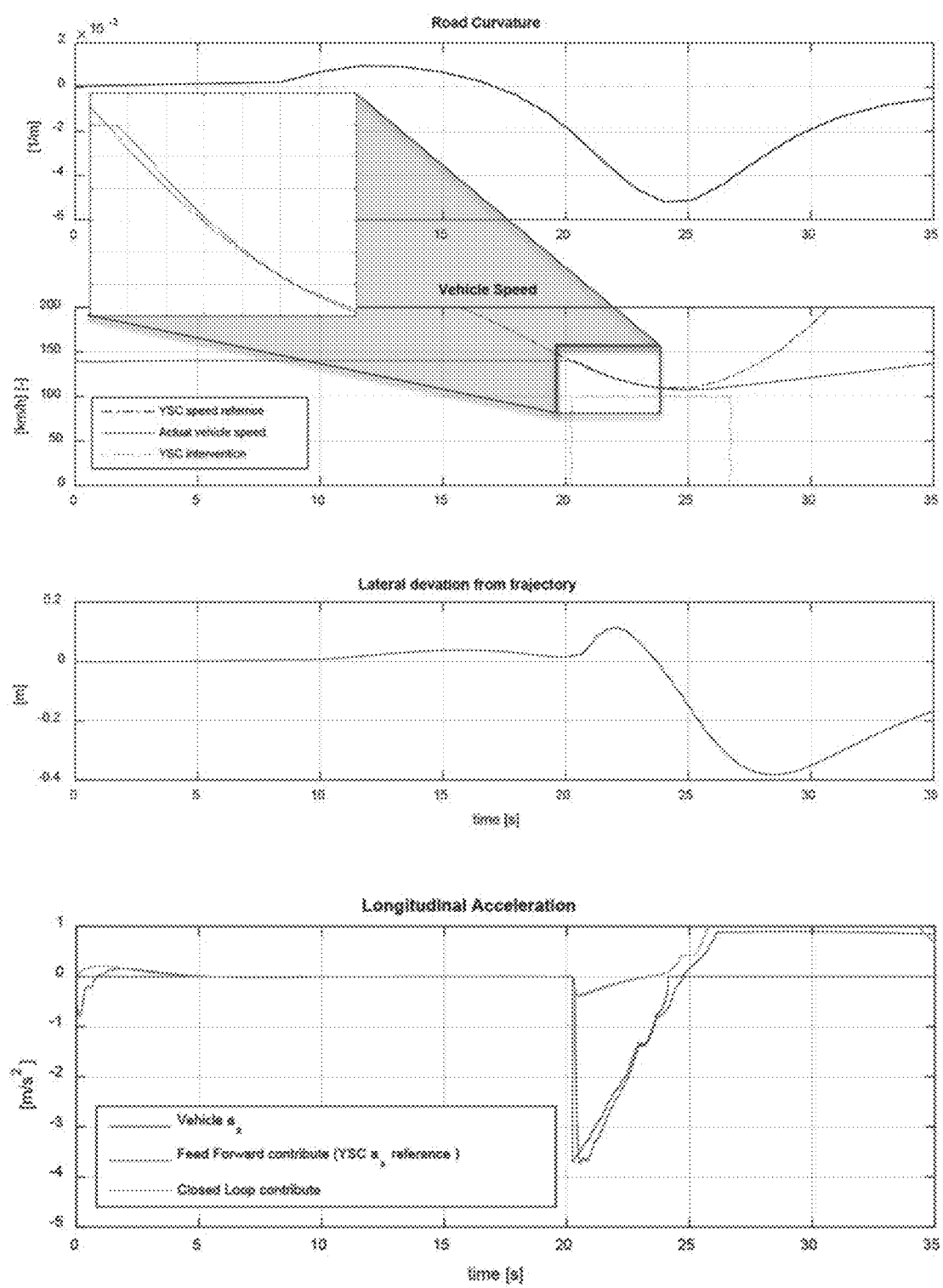
FIG. 3 shows the time developments of some physical quantities involved in the automotive preventive stability control algorithm according to the present invention.
Figure 4:
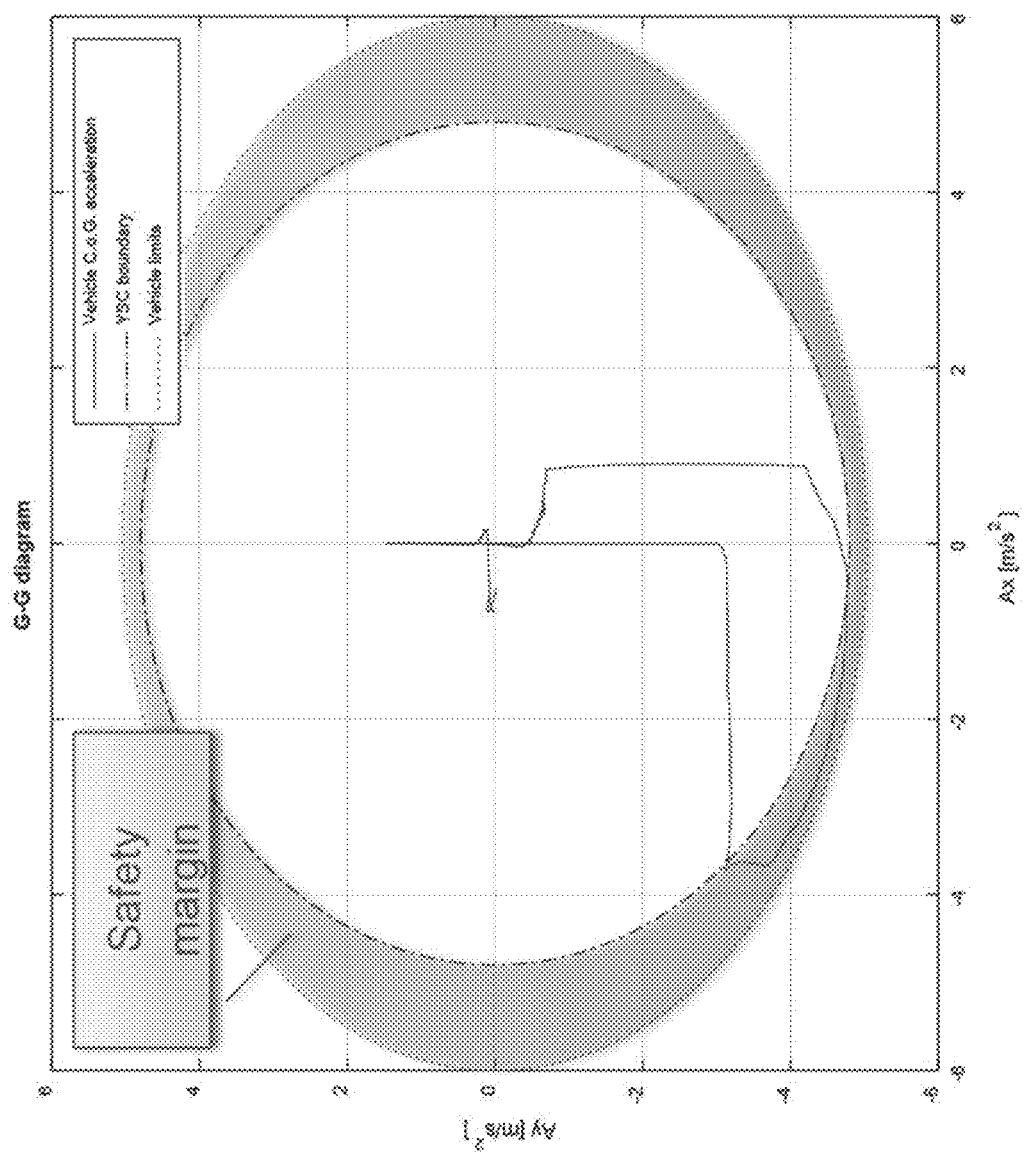
FIG. 4 shows a so-called G-G diagram depicting the trace of the longitudinal and lateral accelerations acting on the centre of gravity of a motor-vehicle, the friction ellipse, the grip limit of the motor-vehicle, and the safety margin between the friction ellipse and the grip limit.

FIG. 2 shows a block diagram of the Simulink architecture used for simulating the behaviour of the automotive preventive stability control algorithm according to the present invention, while FIG. 3 shows the Simulink-simulated time developments of the road curvature, the driving speed, and the longitudinal acceleration of the motor-vehicle and of the lateral deviation of the motor-vehicle from the expected trajectory, while FIG. 4 shows the aforementioned G-G diagram depicting the trace of the longitudinal and lateral accelerations acting on the centre of gravity (CoG) of the motor-vehicle, the friction ellipse (Yaw Stability Control—YSC—boundary), the grip limit of the motor-vehicle, and the safety margin between the friction ellipse and the grip limit.

As shown in FIG. 2, the automotive preventive stability control algorithm receives motor-vehicle-related data outputted by various automotive sensors as well as by various ADAS electronic control units, and outputs a reference driving speed profile $V_{refiESC}$ that the motor-vehicle must implement from its current position up to the most driving-safety-critical road stretch, as well as an activation (or trigger) flag $iESC_{active}$ indicative of the need, or not, to operate the braking system of the motor-vehicle to cause the motor-vehicle to decelerate to such an extent as to result in the most driving-safety-critical road bend being driven along with speed $V_{x\_start}$.

The reference driving speed profile $V_{refiESC}$ is inputted to both a feedback control branch and a feed-forward control branch designed to control the longitudinal acceleration of the motor-vehicle, which output, in a known manner and therefore not described in detail, a feedback contribute $a_{x\_refLong}$ and a feed-forward contribute $a_{x\_refFF}$ to the longitudinal acceleration, which are summed to output a reference longitudinal acceleration profile $a_{x\_ref}$ that is then inputted to a closed-loop control block designed to control the longitudinal acceleration of the motor-vehicle.

The feed-forward contribute $a_{x\_refFF}$ to the longitudinal acceleration of the motor-vehicle is a deceleration profile that must be followed by the motor-vehicle from its current position up to the most driving-safety-critical road bend to cause the latter to be driven at the speed $V_{x\_start}$ and is therefore only generated in the presence of an activation flag $iESC_{active}$ indicative of the need to operate the motor-vehicle's braking system.

Figure 5:
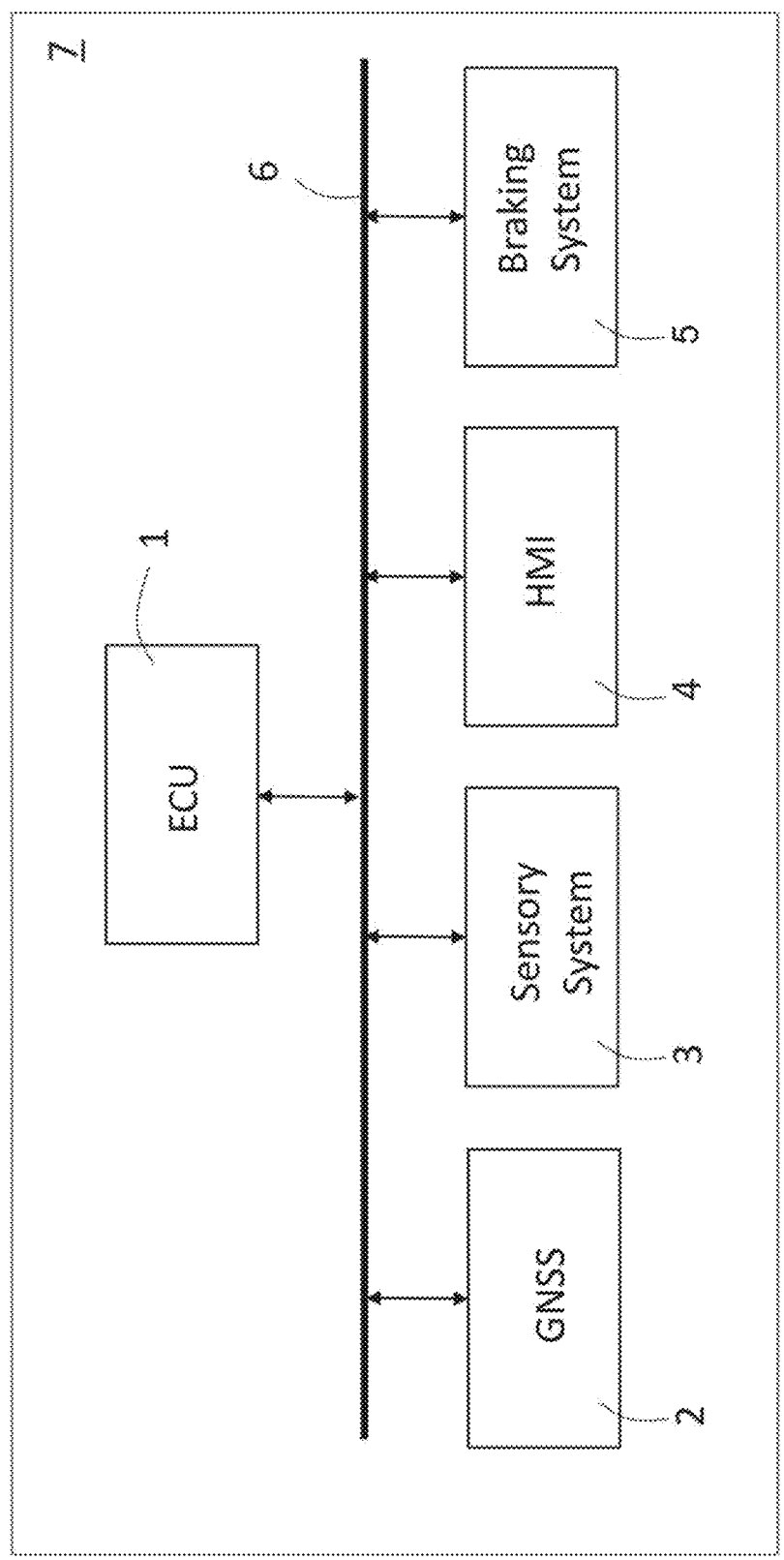
FIG. 5 shows a block diagram of the implementation of an automotive electronic preventive active safety system aimed at improving the driving stability of a motor-vehicle according to the present invention.

FIG. 5 shows a block diagram of the automotive electronic preventive active safety system aimed at improving the driving stability of a motor-vehicle, according to the present invention.

As shown in FIG. 5, from a strictly implementative viewpoint, the automotive preventive stability control algorithm is implemented in an electronic control unit that can indifferently be an electronic control unit which the motor-vehicle is already equipped with to carry out another function and suitable for that purpose, for example the electronic control unit provided to control driving stability of the motor-vehicle, or an electronic control unit specifically dedicated to the implementation of the automotive preventive stability control algorithm, just as the feedback and feed-forward control branches designed to control the longitudinal acceleration of the motor-vehicle could both be implemented in the electronic control unit where the automotive preventive stability control algorithm is implemented, or, as shown in FIG. 2 by way of non-limitative example, could be implemented in a different electronic control unit, in the case shown the electronic control unit designed to control breaking of the motor-vehicle.

The electronic control unit where the automotive preventive stability control algorithm is implemented, referenced in FIG. 5 by reference numeral 1, must therefore be connected or connectable to the electronic control units of the various on-board automotive systems with which it must communicate and cooperate to implement the automotive electronic preventive active safety system aimed at improving the driving stability of a motor-vehicle according to the present invention, in this case the automotive global satellite navigation system, referenced by reference numeral 2, the automotive sensory system, referenced by reference numeral 3, the automotive user interface, referenced by reference numeral 4, and the automotive braking system, referenced by reference numeral 5, via an automotive on-board communication network, for example CAN, FlexRay or others, referenced by reference numeral 6, through which the electronic control unit 1 can receive the motor-vehicle-related data necessary to implement the automotive preventive stability control algorithm and the other functions and tasks for which it is programmed and to output commands to the automotive user interface 4 or to the automotive braking system 6 of the motor-vehicle, which is schematically represented and referenced by reference numeral 7.

The invention claimed is:

1. An automotive electronic preventive active safety system for improving driving stability of a motor-vehicle, to the system comprising a control module configured to:
receive data indicative of a current position of the motor-vehicle, of roads and characteristics thereof comprising road curvature, and of potential driving routes of the motor-vehicle from a current position up to an electronic horizon thereof;
identify a driving-safety-critical road stretch along a driving route of the motor-vehicle;
determine a driving speed profile for the motor-vehicle to follow from its current position to through the identified driving-safety-critical road stretch to result in the motor-vehicle being driven through the driving-safety-critical road stretch at a driving speed that satisfies a predetermined driving safety criterion for navigating the driving-safety-critical road stretch, the driving speed profile determined in a direction starting at the driving-safety-critical road stretch towards the current position of the motor-vehicle;
compare a current position and a current speed of the motor-vehicle to the driving speed profile; and
if the current speed of the motor-vehicle at the current position is greater than or equal to the driving speed determined by the driving speed profile for the current position, at least one of:
(a) command the motor-vehicle to decelerate to the driving speed determined by the driving speed profile for the current position; and
(b) generate a request to a driver of the motor-vehicle to decelerate the motor-vehicle to the driving speed determined by the driving speed profile for the current position.

2. The automotive electronic preventive active safety system according to claim 1, wherein the control module is further configured to identify the driving-safety-critical road stretch based on data indicative of a road curvature along a most probable driving route of the motor-vehicle.

3. The automotive electronic preventive active safety system according to claim 2, wherein the control module is further configured to identify the driving-safety-critical road stretch by searching for a road stretch with a minimum driving speed along the driving route of the motor-vehicle based on the road curvature along the driving route of the motor-vehicle and on an acceleration/deceleration limit value that the motor-vehicle should not exceed while driving along the driving-safety-critical road stretch.

4. The automotive electronic preventive active safety system according to claim 2, wherein the control module is further configured to identify the driving-safety-critical road stretch also based on data indicative of a road adherence along the driving route of the motor-vehicle.

5. The automotive electronic preventive active safety system according to claim 1, wherein the control module is further configured to compute the driving speed profile based on the road curvature along the driving route of the motor-vehicle and on a maximum longitudinal deceleration that the motor-vehicle should not exceed.

6. The automotive electronic preventive active safety system according to claim 1, wherein the control module is further configured to identify the driving-safety-critical road stretch as the most driving-safety-critical road bend along the driving route of the motor-vehicle from a current position up to the electronic horizon.

7. The automotive electronic preventive active safety system according to claim 1, wherein the control module is further configured to at least one of generate the request as a visual/audible/haptic request to the driver of the motor-vehicle via an automotive user interface, and control a braking system of the motor-vehicle to slow the motor-vehicle to the driving speed determined by the driving speed profile for the current position.

8. The automotive electronic preventive active safety system according to claim 1, wherein the control module is further configured to communicate with an automotive satellite navigation system and an automotive sensory system via an automotive communication network to receive output data therefrom and to determine the current position of the motor-vehicle, the roads, the road junctions and their characteristics, and the potential driving routes of the motor-vehicle from the current position to the electronic horizon thereof.

9. A motor-vehicle comprising an automotive satellite navigation system, an automotive braking system, an automotive user interface, and the automotive electronic preventive active safety system of claim 1.

10. A software loadable in the control module configured to cause, when executed by the control module, the automotive electronic preventive active safety system to become configured as claimed in claim 1.

* * * * *